(12) United States Patent
Li et al.

(10) Patent No.: US 11,764,360 B2
(45) Date of Patent: Sep. 19, 2023

(54) NEGATIVE ELECTRODE PLATE, LITHIUM METAL BATTERY, AND APPARATUS INCLUDING THE LITHIUM METAL BATTERY

(71) Applicant: CONTEMPORARY AMPEREX TECHNOLOGY CO., LIMITED, Ningde (CN)

(72) Inventors: Qian Li, Ningde (CN); Meng Cheng, Ningde (CN); Chengyong Liu, Ningde (CN); Bobing Hu, Ningde (CN); Jiawei Fu, Ningde (CN); Shengyuan Huang, Ningde (CN); Yongsheng Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 78 days.

(21) Appl. No.: 17/559,378

(22) Filed: Dec. 22, 2021

(65) Prior Publication Data

US 2022/0115666 A1 Apr. 14, 2022

Related U.S. Application Data

(63) Continuation of application No. PCT/CN2020/106470, filed on Jul. 31, 2020.

(30) Foreign Application Priority Data

Sep. 10, 2019 (CN) .......................... 201910850600.X

(51) Int. Cl.
| | | |
|---|---|---|
| *H01M 4/62* | (2006.01) | |
| *H01M 4/73* | (2006.01) | |
| *H01M 4/04* | (2006.01) | |
| *H01M 10/0525* | (2010.01) | |
| *C08J 5/18* | (2006.01) | |
| *H01M 4/02* | (2006.01) | |

(52) U.S. Cl.
CPC .............. *H01M 4/623* (2013.01); *C08J 5/18* (2013.01); *H01M 4/0404* (2013.01); *H01M 4/73* (2013.01); *C08J 2353/00* (2013.01); *H01M 10/0525* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 10,658,671 B2 | 5/2020 | Liu et al. | |
| 2017/0301920 A1 | 10/2017 | Liu et al. | |
| 2017/0324097 A1 | 11/2017 | Lee et al. | |
| 2018/0366735 A1 | 12/2018 | Liu et al. | |
| 2019/0190005 A1 | 6/2019 | Lee et al. | |

FOREIGN PATENT DOCUMENTS

| | | |
|---|---|---|
| CN | 106299244 A | 1/2017 |
| CN | 107579204 A | 1/2018 |
| CN | 108321355 A | 7/2018 |
| CN | 109004276 A | 12/2018 |
| CN | 109103517 A | 12/2018 |
| CN | 105591071 A | 5/2019 |

OTHER PUBLICATIONS

ISR for International Application PCT/CN2020/106470 dated Nov. 4, 2020.
Written Opinion for International Application PCT/CN2020/106470 dated Nov. 4, 2020.
OA1 of CN priority application dated Jul. 29, 2021.
Extended European Search Report of EP Application No. 20862029.4, dated Mar. 16, 2022.
International Search Report of Application No. PCT/CN2020/106470, dated Nov. 4, 2020.
Written Opinion of International Search Authority for Application No. PCT/CN2020/106470, dated Nov. 4, 2020.

*Primary Examiner* — Carlos Barcena
(74) *Attorney, Agent, or Firm* — Ladas & Parry LLP

(57) ABSTRACT

This application provides a negative electrode plate, a lithium metal battery, and an apparatus including the lithium metal battery. The negative electrode plate includes a negative electrode current collector and a lithium-metal negative electrode disposed on at least one surface of the negative electrode current collector, where a polymer protective film is disposed on a surface of the lithium-metal negative electrode away from the negative electrode current collector, the polymer protective film includes a citric acid copolymer, and a number-average molecular weight Mn of the citric acid copolymer is 10,000 to 1,000,000. In this application, a polymer protective film with high tensile strength, high puncture strength, high elongation, and high electrolyte holding capacity may be formed on the surface of the lithium-metal negative electrode in the negative electrode plate.

14 Claims, 7 Drawing Sheets

NEGATIVE ELECTRODE PLATE, LITHIUM METAL BATTERY, AND APPARATUS INCLUDING THE LITHIUM METAL BATTERY

CROSS-REFERENCE TO RELATED APPLICATIONS

This application is a continuation of International Patent Application No. PCT/CN2020/106470 filed on Jul. 31, 2020, which claims priority to Chinese Patent Application No. 201910850600.X, filed on Sep. 10, 2019. The aforementioned patent applications are incorporated herein by reference in their entirety.

TECHNICAL FIELD

This application relates to the battery field, and in particular, to a negative electrode plate and a lithium metal battery.

BACKGROUND

Lithium metal has become the best choice of negative electrode material for the next generation of high specific energy secondary batteries due to its advantages such as ultrahigh theoretical specific capacity: 3860 mAh $g^{-1}$, the lowest reduction potential: −3.04 V vs. standard hydrogen electrode, and low density: 0.534 g $cm^{-3}$. However, uncontrollable growth of lithium dendrites caused by irregular deposition of lithium ions on the surface of negative electrode leads to safety problems during use of lithium metal batteries, and thus restricts the wide application of lithium metal batteries.

At present, many researches in the field of lithium metal batteries focus on adding to the electrolyte functional additives such as vinylene carbonate, fluoroethylene carbonate (fluoroethylene carbonate), 2-methylfuran, and some alkali metal cations. A new SEI film is formed by utilizing the foregoing additives to adsorb, decompose, and polymerize with lithium metal to enhance the lithium metal surface and improve cycle performance of lithium secondary batteries. However, problems with the foregoing prior art are that the protective film formed in situ has relatively weak mechanical strength and does not fully cover the lithium metal, and thus cannot entirely prevent the severe and continuous reorganization of SEI films caused by morphology change of lithium metal during lithium deposition/dissolution; and the generation of lithium dendrites and many problems that follow have not been substantively resolved.

SUMMARY

In view of the problems in the Background, this application is intended to provide a negative electrode plate and a lithium metal battery to improve safety of lithium metal batteries during use.

In order to achieve the above objective, a first aspect of this application provides a negative electrode plate, including a negative electrode current collector and a lithium-metal negative electrode disposed on at least one surface of the negative electrode current collector, where a polymer protective film is disposed on a surface of the lithium-metal negative electrode away from the negative electrode current collector, the polymer protective film includes a citric acid copolymer, and a number-average molecular weight Mn of the citric acid copolymer is 10,000 to 1,000,000.

A second aspect of this application provides a lithium metal battery, including a positive electrode plate, a negative electrode plate, a separator sandwiched between the positive electrode plate and the negative electrode plate, and an electrolyte, where the negative electrode plate is the negative electrode plate provided in the first aspect of this application.

This application further provides an apparatus, including the foregoing lithium metal battery.

Compared with the prior art, this application includes at least the following beneficial effects:

In the negative electrode plate provided in this application, there is a citric acid copolymer with a number-average molecular weight Mn of 10,000 to 1,000,000 on the surface of the lithium-metal negative electrode. A structure of the citric acid copolymer contains a large number of carboxyl groups and hydroxyl groups that can react with lithium metal, and therefore a polymer protective film with high tensile strength, high puncture strength, high elongation, and high electrolyte holding capacity can be formed on the surface of the negative electrode plate. Using the negative electrode plate provided by this application in a lithium-metal secondary battery can effectively slow down or even inhibit the growth of lithium dendrites, reduce consumption by side reactions between an electrolyte and the lithium metal, and improve initial charge and discharge coulomb efficiency of the lithium-metal secondary battery, thereby significantly improving cycle stability and safety of the lithium-metal secondary battery. The apparatus in this application includes the secondary battery provided by this application, and therefore provides at least the same advantages as the secondary battery.

DESCRIPTION OF EMBODIMENTS

Figure 1:
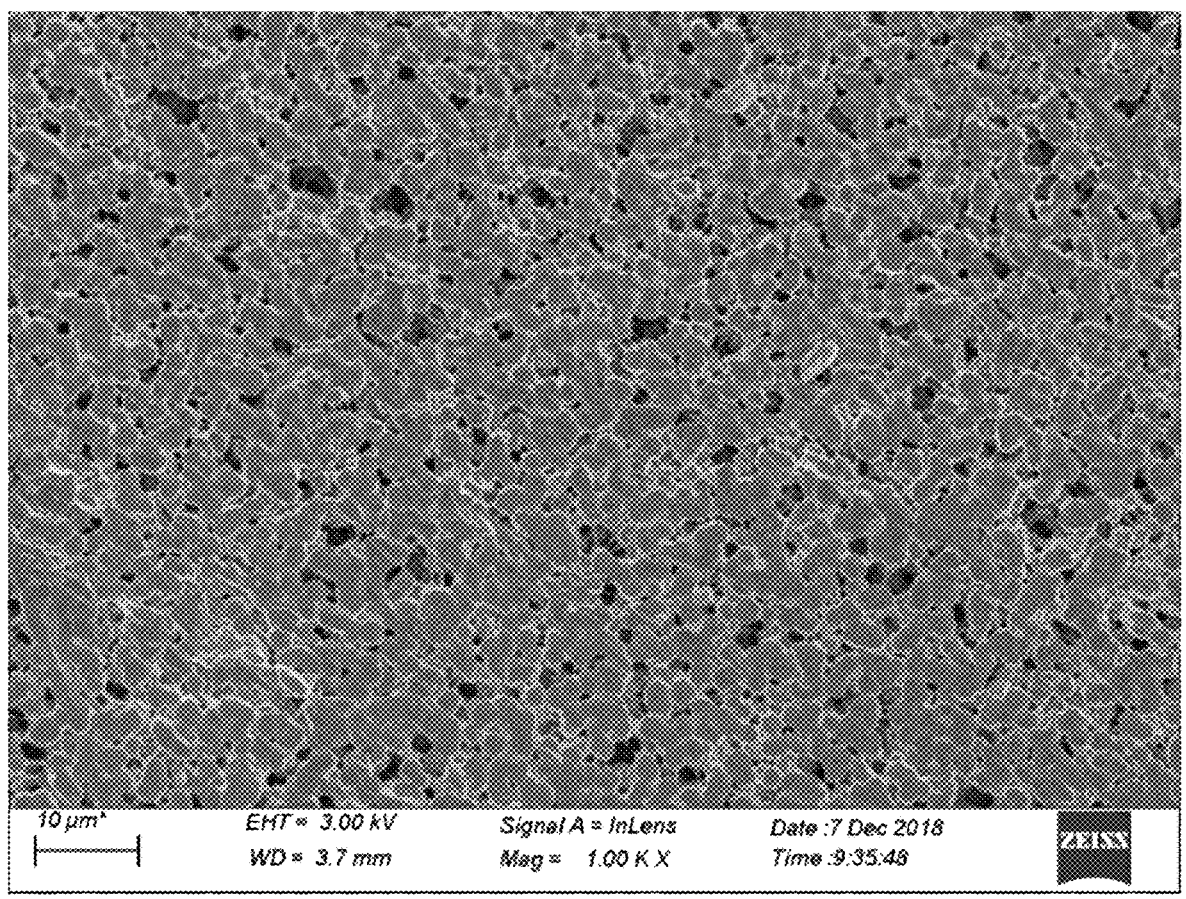
FIG. 1 is a scanning electron microscopy image of a polymer film in Comparative Example 2 at 1,000 times magnification.

The following describes in detail a negative electrode plate and a lithium metal battery in this application.

In the first aspect of this application, a negative electrode plate includes a negative electrode current collector and a lithium-metal negative electrode disposed on at least one surface of the negative electrode current collector, where a polymer protective film is disposed on a surface of the lithium-metal negative electrode away from the negative electrode current collector, the polymer protective film includes a citric acid copolymer, and a number-average molecular weight Mn of the citric acid copolymer is 10,000 to 1,000,000.

In the negative electrode plate of this application, the lithium-metal negative electrode has a polymer protective film provided on the surface, where the polymer protective film includes a citric acid copolymer with a number-average molecular weight Mn of 10,000 to 1,000,000, and a structure of the citric acid copolymer contains a large amount of carboxyl and hydroxyl groups that can react with lithium metal, thus a polymer protective film with high tensile strength, high puncture strength, high elongation, and high electrolyte holding capacity can be formed. Using the negative electrode plate of this application in a lithium-metal secondary battery can effectively slow down or even inhibit growth of lithium dendrites, reduce consumption by side reactions between an electrolyte and the lithium metal, and improve initial charge and discharge coulomb efficiency of the lithium-metal secondary battery, thereby significantly improving cycle stability and safety of the lithium-metal secondary battery.

The citric acid copolymer includes a PLA-co-CA reactive block polymer represented by formula (I) and/or a PEG-co-CA reactive block polymer represented by formula (II):

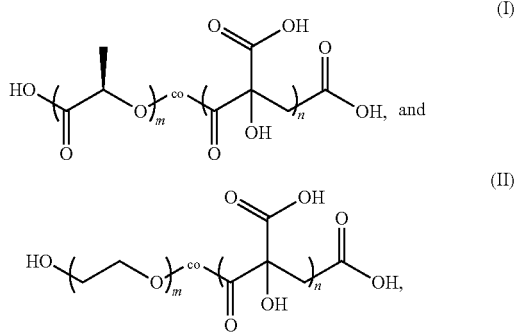

where m is an integer selected from 10 to 5000, and n is an integer selected from 10 to 5000.

Preferably, m is an integer selected from 400 to 600, n is an integer selected from 1000 to 2000, and Mn is 80,000 to 350,000.

Preferably, the citric acid copolymer includes a mixture of reactive block polymers represented by formula (I) and formula (II), where a mass ratio of the reactive block polymers represented by formula (I) and formula (II) is 1:1 to 1:2, and n/m is 2.5 to 3.5, preferably, 2.8 to 3.0.

Preferably, in the negative electrode plate of this application, the polymer protective film further includes a fluorine-containing lithium salt, a fluorine-containing film former, and an inorganic filler, where the fluorine-containing lithium salt is selected from one or more of lithium bistrifluoromethanesulfonimide (LiTFSI), lithium bisfluoromethylsulfonimide (LiFSI), and lithium difluoro (oxalate) borate (LiDFOB), and these lithium salts are conducive to in-situ formation of LiF on the surface of lithium metal, which inhibits the growth of lithium dendrites to some extent; the fluorine-containing film former is selected from one or more of polyvinylidene fluoride (PVDF), polyvinylidene fluoride-hexafluoropropylene (PVDF-HFP), and polytetrafluoroethylene (PTFE), and these fluorine-containing film former can also form LiF in situ on the surface of the lithium metal; and the inorganic filler is selected from one or more of $Al_2O_3$, $TiO_2$, and $SiO_2$, and the introduction of these inert fillers can more significantly improve chemical stability and mechanical strength of the polymer protective film.

Alternatively, the polymer protective film includes lithium bisoxalateborate (LiBOB), a fluorine-containing film former, and an inorganic filler, where the fluorine-containing film former and the inorganic filler are used as described above.

Preferably, a particle size of the inorganic filler is 10 nm to 1000 nm, preferably, 50 nm to 500 nm. The introduction of inorganic nano-particles in this size range can more effectively improve mechanical strength of the polymer protective film.

Preferably, parts by mass of the reactive block polymer, the fluorine-containing film former, the inorganic filler, and the fluorine-containing lithium salt in the polymer protective film are respectively 25 parts to 60 parts, 30 parts to 80 parts, 1 part to 10 parts, and 1 part to 10 parts. Further preferably, parts by mass of the reactive block polymer, the fluorine-containing film former, the inorganic filler, and the fluorine-containing lithium salt in the polymer protective film are respectively 30 parts to 40 parts, 50 parts to 70 parts, 3 parts to 8 parts, and 3 parts to 8 parts.

Parts by mass of the reactive block polymer, the fluorine-containing film former, the inorganic filler, and the lithium bisoxalateborate in the polymer protective film are respectively 25 parts to 60 parts, 30 parts to 80 parts, 1 part to 10 parts, and 1 part to 10 parts.

Preferably, parts by mass of the reactive block polymer, the fluorine-containing film former, the inorganic filler, and the lithium bisoxalateborate in the polymer protective film are respectively 30 parts to 40 parts, 50 parts to 70 parts, 3 parts to 8 parts, and 3 parts to 8 parts.

Preferably, in the negative electrode plate of this application, thickness of the polymer protective film is 5 μm to 30 μm, preferably, 15 μm to 20 μm. Within the above range provided by this application, the thickness of the protective film is positively correlated with the ability to inhibit the growth of lithium dendrites, but an excessively thick protective film may increase battery polarization and affect battery energy efficiency.

In addition, tensile strength of the polymer protective film is 0.5 MPa to 3.0 MPa, preferably, 2.0 MPa to 3.0 MPa; puncture strength of the polymer protective film is 0.5 MPa to 2.0 MPa, preferably, 0.9 MPa to 2.0 MPa; and elongation is 100% to 500%, preferably, 250% to 500%. The tensile strength, puncture strength and elongation can be adjusted by adjusting a ratio of reactive block polymer, fluorine-containing film former, fluorine-containing lithium salt, and inorganic filler in the formula. Relatively high tensile strength and puncture strength can more effectively inhibit the growth of lithium dendrites; and relatively high elongation ensures that the expansion of the lithium metal battery during charging and discharging may not cause damage to the protective film.

Preferably, electrolyte holding capacity of the polymer protective film is 50% to 200%, preferably, 100% to 200%.

In the negative electrode plate of this application, the negative electrode current collector is typically a structure or component that collects current. The negative electrode current collector may be various materials suitable to be used as the negative electrode current collector of an electrochemical energy storage apparatus in the art. For example, the negative electrode current collector includes but is not limited to a metal foil, and more specifically includes but is not limited to a copper foil.

In the negative electrode plate of this application, the lithium-metal negative electrode can be arranged on one surface of the negative electrode current collector, or on two surfaces of the negative electrode current collector.

Those skilled in the art can choose a conventional method to prepare the negative electrode plate of this application. For preparation of the polymer protective film disposed on the surface of the lithium-metal negative electrode, dry extrusion or wet coating can be used. The following describes preparation processes of the negative electrode plate of this application with examples.

Preparation process 1 of the negative electrode plate of this application (where the film is prepared by dry extrusion):

(1) selecting a 10 μm to 50 μm lithium belt and a 6 μm to 12 μm copper foil and performing cutting after rolling under a pressure of 20 MPa to 50 MPa to obtain a lithium-metal negative electrode plate; and (2) performing heating to make constituents of the polymer protective layer melted and evenly mixed, and then applying the resulting mixture on a surface of the lithium-metal negative electrode plate by extrusion.

Preparation process 2 of the negative electrode plate of this application (where the film is prepared by wet coating):

(1) selecting a 10 μm to 50 μm lithium belt and a 6 μm to 12 μm copper foil and performing cutting after rolling under a pressure of 20 MPa to 50 MPa to obtain a lithium-metal negative electrode plate; and (2) using triethyl phosphate as a solvent, heating constituents of a polymer protective layer dissolved in the solvent to 70° C., and stirring until they are evenly dispersed, then applying the resulting mixture on a surface of the lithium-metal negative electrode, and drying them under vacuum at room temperature for 4 hours.

A lithium metal battery in the second aspect of this application includes a positive electrode plate, a negative electrode plate, a separator sandwiched between the positive electrode plate and the negative electrode plate, and an electrolyte, where the negative electrode plate is the negative electrode plate in the first aspect of this application.

Preferably, in the lithium metal battery of this application, the electrolyte preferably includes fluoroethylene carbonate, linear carbonate, and fluorine-containing lithium salt. A mass percentage of the fluoroethylene carbonate in the electrolyte is 20% to 50%; and the fluorine-containing lithium salt is a mixture of one or more of lithium bistrifluoromethanesulfonimide (LiTFSI), lithium bisfluoromethanesulfonimide (LiFSI) and lithium difluoro (oxalate) borate (LiDFOB), and a concentration of the fluorine-containing lithium salt in the electrolyte is 0.5 mol/L to 10 mol/L, preferably, 1 mol/L to 5 mol/L.

Alternatively, the electrolyte includes fluoroethylene carbonate, linear carbonate, and lithium bisoxalateborate (LiBOB), where a mass percentage of fluoroethylene carbonate is 20% to 50%.

In the lithium metal battery of this application, the foregoing electrolytes can be mixed in use, where the fluoroethylene carbonate and the fluorine-containing lithium salt can form a relatively stable electrolyte holding interface with the lithium metal negative electrode, thereby slowing down consumption of the electrolyte by the lithium metal to some extent; the polymer protective layer has relatively good electrolyte holding capacity for fluoroethylene carbonate, further reducing consumption of fluoroethylene carbonate; and linear carbonate has relatively low viscosity and high ionic conductivity, which can improve rate performance of the battery.

In addition, the positive electrode plate and the separator in the lithium metal battery of this application may use a conventional positive electrode plate and separator in the art.

In the lithium metal battery of this application, the positive electrode plate may include a positive electrode current collector and a positive electrode active substance layer disposed on at least one surface of the positive electrode current collector. In the positive electrode plate, the positive electrode active substance layer can be disposed on one surface of the positive electrode current collector, or on two surfaces of the positive electrode current collector. Those skilled in the art may select a suitable method for preparing the positive electrode plate, and for example, the following steps may be included: mixing a positive electrode active material, a binder, and a conductive agent to form a slurry, and applying the slurry on the positive electrode current collector.

There is no special limitation on the specific types of the positive electrode active substance, as long as it can accept and release lithium ions. The positive electrode active substance can be either a layered structural material to diffuse lithium ions in a two-dimensional space, or a spinel structure to diffuse lithium ions in a three-dimensional space. Preferably, the positive electrode active substance may be selected from lithium transition metal oxides, where the lithium transition metal oxides may further be doped with other transition metals or non-transition metals or non-metals. Specifically, the positive electrode active substance can be preferably selected from one or more of lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphate.

The general formula of the olivine-type lithium-containing phosphate may be $LiFe_{1-x-y}Mn_xM'_yPO_4$, where $0 \leq x \leq 1$, $0 \leq y < 1$, $0 \leq x+y \leq 1$, and M' is selected from one or more of transition metal elements or non-transition metal elements other than Fe and Mn, preferably one or more of Cr, Mg, Ti, Al, Zn, W, Nb, and Zr. Preferably, the olivine-type lithium-containing phosphate is selected from one or more of lithium iron phosphate, lithium manganese phosphate, and lithium manganese iron phosphate.

The lithium transition metal oxide is selected from one or more of $LiCoO_2$, $LiMnO_2$, $LiNiO_2$, $LiMn_2O_4$, $LiNi_xCo_yMn_{1-x-y}O_2$, $LiNi_xCo_yAl_{1-x-y}O_2$, and $LiNi_xMn_{2-x}O_4$, where $0<x<1$, $0<y<1$, and $0<x+y<1$; and preferably, the lithium transition metal oxide is selected from one or more of $LiCoO_2$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.15}Mn_{0.05}O_2$, $LiNi_{0.8}Co_{0.15}Al_{0.05}O_2$, $LiNi_{0.5}Mn_{1.5}O_4$, and $LiMn_2O_4$.

The positive electrode active substance layer may further include a conductive agent and a binder. The conductive agent and the binder are not limited to any specific types or content amounts, but may be selected according to actual needs. The binder typically includes fluorine-containing polyolefin binders. For the fluorine-containing polyolefin binders, water is usually a good solvent. In other words, the fluorine-containing polyolefin binders usually exhibit good solubility in water. For example, the fluorine-containing polyolefin binders include but are not limited to polyvinylidene fluoride (PVDF), vinylidene fluoride copolymer, or their modified (for example, modified by carboxylic acid, acrylic acid, or acrylonitrile) derivatives. In the positive electrode active substance layer, a mass percentage of the binder cannot be excessively high due to poor conductivity of the binder itself. Preferably, the mass percentage of the binder in the positive electrode active substance layer is less than or equal to 2 wt % so as to obtain relatively low impedance of the electrode plate. The conductive agent of the positive electrode plate may be various conductive agents suitable for lithium-ion (secondary) batteries in the field, for example, including but not limited to one or more of acetylene black, conductive carbon black, vapor grown carbon fiber (VGCF), carbon nanotubes (CNT), Ketjen black, and the like. The weight of the conductive agent may account for 1 wt % to 10 wt % of the total weight of the positive electrode active substance layer. More preferably, a weight ratio of the conductive agent to the positive electrode active substance in the positive electrode plate is greater than or equal to 1.5:95.5.

The positive electrode current collector is also not limited to any specific type, but may be selected according to actual needs. The positive electrode current collector may typically be layered, and the positive electrode current collector is typically a structure or component that can collect current. The positive electrode current collector may be various materials suitable to be used as the positive electrode current collector of an electrochemical energy storage apparatus in the art. For example, the positive electrode current collector includes but is not limited to a metal foil, and more specifically, includes but is not limited to a nickel foil or an aluminum foil.

In the lithium metal battery of this application, the separator may be of various materials suitable for electrochemical energy storage apparatuses in the field, for example, including but not be limited to one or more of polyethylene, polypropylene, polyvinylidene fluoride, kevlar, polyethylene terephthalate, polytetrafluoroethylene, polyacrylonitrile, polyimide, polyamide, polyester, and natural fiber.

The lithium metal battery may be prepared by a method known to those skilled in the art. For example, the positive electrode plate, the separator, and the negative electrode plate may each be layered, and thus can be cut to a target size and then stacked in order. The stack may be further wound to a target size to form a battery core, which may be further combined with an electrolyte to form a lithium metal battery.

In addition, this application further proposes a parameter for evaluating performance of the polymer protective film added in the lithium metal battery of this application, that is, an electrolyte holding coefficient (Electrolyte Holding coefficient, EH) of the protective film. The test method is as follows: a mass of the lithium-metal negative electrode without the protective film is measured and recorded as m0 and a mass of the lithium-metal negative electrode with the protective film is measured and recorded as m1; and the lithium metal negative electrode with the protective film is immersed in the electrolyte for 8 hours and taken out after it is filled up with the electrolyte, with the electrolyte adhered on the surface wiped off, the mass of the negative electrode was measured and record as m2. In this case, $((m1-m0)/(m2-m0)-1)$ is the conventional electrolyte intake coefficient (electrolyte intake coefficient). Then the lithium-metal negative electrode is placed in a 25° C. thermostat and left to stand. Its mass is measured every 24 hours until its mass change is less than or equal to 1%, and its final mass is recorded as m3, where an electrolyte holding coefficient is $EH=((m3-m0)/(m1-m0)-1)$. The conventional electrolyte intake coefficient mainly reflects the storage of the electrolyte by physical structures such as pores of the protective film, and the electrolyte holding coefficient can reflect capacity of the chemical structure of the protective film to absorb the electrolyte, and can more truly reflect the storage of the electrolyte by the protective film in a long cycling lithium secondary battery, and thus has more reference value than the electrolyte intake coefficient.

Figure 6:
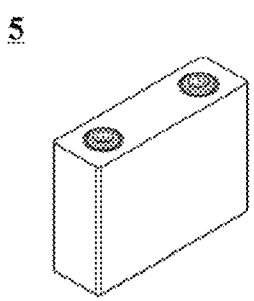
FIG. 6 is a schematic diagram of an embodiment of a lithium metal battery.

This application does not impose special limitations on a shape of the lithium metal battery, and the lithium-ion battery may be a square or any other shapes. FIG. 6 shows a lithium metal battery 5 of a square structure as an example.

In some embodiments, the lithium metal battery may include an outer package for encapsulating a positive electrode plate, a negative electrode plate, a separator, and an electrolyte.

In some embodiments, the outer package of the lithium metal battery may be a soft package, for example, a soft bag. A material of the soft package may be plastic, for example, may include one or more of polypropylene PP, polybutylene terephthalate PBT, polybutylene succinate PBS, and the like. Alternatively, the outer package of the lithium metal battery may be a hard shell, for example, a hard plastic shell, an aluminum shell, and a steel shell.

In some embodiments, lithium metal batteries may be combined into a battery module, and the battery module may include a plurality of secondary batteries. A specific quantity may be adjusted based on application and capacity of the battery module.

Figure 7:
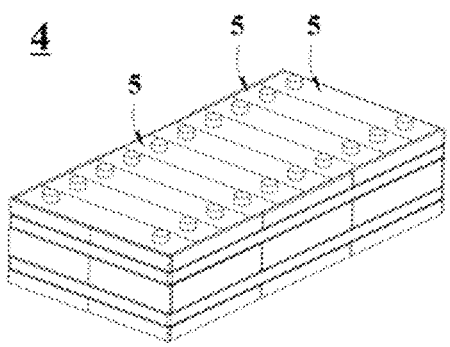
FIG. 7 is a schematic diagram of an embodiment of a battery module.

FIG. 7 shows a battery module 4 used as an example. Referring to FIG. 7, in the battery module 4, a plurality of lithium metal batteries 5 may be sequentially arranged in a length direction of the battery module 4. Certainly, the plurality of lithium metal batteries 5 may be arranged in any other manner. Further, the plurality of lithium metal batteries 5 may be fixed by using fasteners.

Optionally, the battery module 4 may further include a housing with an accommodating space, and the plurality of lithium metal batteries 5 are accommodated in the accommodating space.

In some embodiments, the foregoing battery modules may be further combined into a battery pack, and a quantity of battery modules included in the battery pack may be adjusted based on application and capacity of the battery pack.

Figure 8:
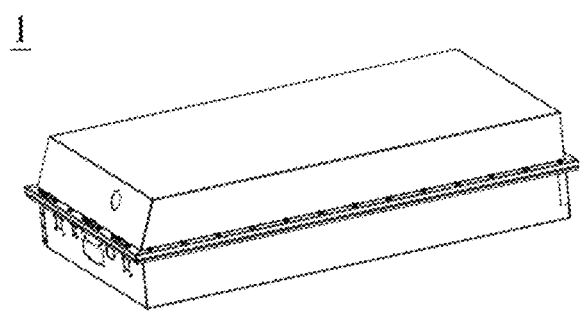
FIG. 8 is a schematic diagram of an embodiment of a battery pack.
Figure 9:
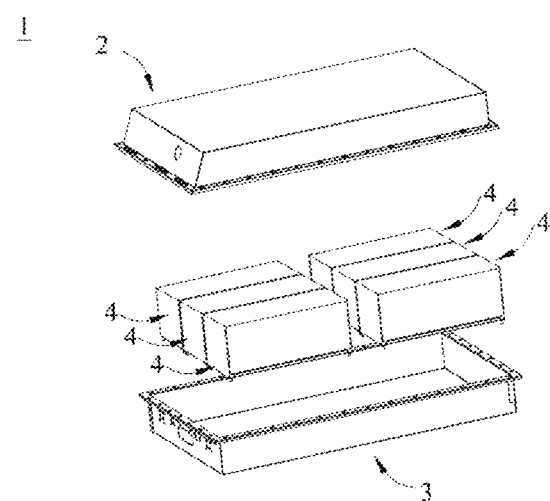
FIG. 9 is an exploded view of FIG. 8.

FIG. 8 and FIG. 9 show a battery pack 1 used as an example. Referring to FIG. 8 and FIG. 9, the battery pack 1 may include a battery box and a plurality of battery modules 4 provided in the battery box. The battery box includes an upper case 2 and a lower case 3. The upper case 2 can cover the lower case 3 to form an enclosed space for accommodating the battery modules 4. The plurality of battery modules 4 may be arranged in the battery box in any manner.

Apparatus

The second aspect of this application provides an apparatus, where the apparatus includes the lithium metal battery in the first aspect of this application. The lithium metal battery may be used as a power source for the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium metal battery, a battery module, or a battery pack may be selected for the apparatus according to requirements for using the apparatus.

Figure 10:
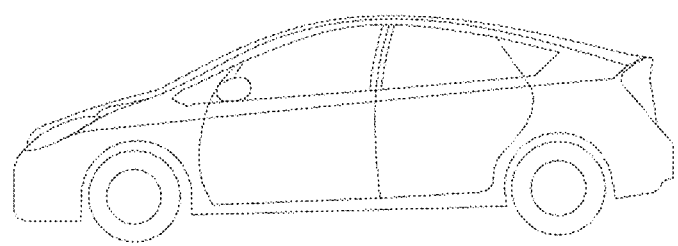
FIG. 10 is a schematic diagram of an embodiment of an apparatus in which a lithium metal battery is used as a power source.

FIG. 10 shows an apparatus used as an example. The apparatus is a battery electric vehicle, a hybrid electric vehicle, a plug-in hybrid electric vehicle, or the like. To meet requirements of the apparatus for a battery with high power and high energy density, a battery pack or a battery module may be used.

In another example, the apparatus may be a mobile phone, a tablet computer, a notebook computer, or the like. The apparatus is usually required to be light and thin, and therefore a secondary battery may be used as its power source.

The following further describes this application with reference to specific examples. It should be understood that these examples are merely used for describing this application but not to limit the scope of this application.

Lithium metal batteries of Examples 1 to 8 were prepared according to the above preparation method. The lithium metal battery includes a positive electrode plate, a negative electrode plate, a separator sandwiched between the positive electrode plate and the negative electrode plate, and an electrolyte. The negative electrode plate includes a negative electrode current collector (a copper foil) and a lithium-metal negative electrode disposed on at least one surface of the negative electrode current collector, where a polymer protective film is disposed on a surface of the lithium-metal negative electrode away from the negative electrode current collector. The positive electrode plate is made of nickel-cobalt-manganese ternary lithium material (NCM811, $LiNi_{0.8}Co_{0.1}Mn_{0.1}O_2$). The electrolyte includes fluoroethylene carbonate, linear carbonate and fluorine-containing lithium salt, where a mass percentage of the fluoroethylene carbonate (FEC) in the electrolyte is 35%; and the lithium salt uses lithium bistrifluoromethanesulfonimide (LiTFSI) with a concentration of 1 mol/L.

In addition, lithium metal batteries of Comparative Examples 1 and 2 were prepared using the same steps. These lithium metal batteries are difference from the lithium metal batteries of Examples 1 to 8 in that the lithium metal battery of Comparative Example 1 does not have a polymer protective film, and a polymer protective film in the lithium metal battery of Comparative Example 2 only contains a fluorine-containing film former and a fluorine-containing lithium salt.

Table 1 below shows specific parameters of the polymer protective films in Examples 1 to 8 and Comparative Examples 1 to 2.

TABLE 1

Specific parameters of polymer protective films in Examples and Comparative Examples

| Number | Reactive block polymer Type | Parts by mass | Fluorine-containing film former Type | Parts by mass | Inorganic filler Type | Parts by mass | Fluorine-containing lithium salt Type | Parts by mass | Film preparation method |
|---|---|---|---|---|---|---|---|---|---|
| Example 1 | PLA-co-CA | 50 | PVDF | 40 | $Al_2O_3$ | 3 | LiTFSI | 7 | Wet |
| Example 2 | PEG-co-CA | 60 | PVDF-HFP | 30 | $SiO_2$ | 3 | LiFSI | 7 | Wet |
| Example 3 | Mixture of PLA-co-CA and PEG-co-CA in equal amounts | 25 | PTFE | 70 | $TiO_2$ | 1 | LiBOB | 4 | Dry |
| Example 4 | Mixture of PLA-co-CA and PEG-co-CA in a mass ratio of 2:1 | 25 | PVDF | 60 | $SiO_2$ | 5 | LiDFOB | 10 | Dry |
| Example 5 | PLA-co-CA | 30 | PVDF | 60 | $SiO_2$ | 5 | LiTFSI | 5 | Dry |
| Example 6 | PEG-co-CA | 25 | PTFE | 65 | $Al_2O_3$ | 4 | LiFSI | 6 | Dry |
| Example 7 | Mixture of PLA-co-CA and PEG-co-CA in equal amounts | 35 | PVDF-HFP | 55 | $TiO_2$ | 7 | LiBOB | 3 | Wet |
| Example 8 | Mixture of PLA-co-CA and PEG-co-CA in a mass ratio 1:2 | 38 | PTFE | 54 | $SiO_2$ | 3 | LiDFOB | 5 | Wet |
| Comparative Example 1 | / | / | / | / | / | / | / | / | / |
| Comparative Example 2 | / | / | PVDF | 90 | / | / | LiTFSI | 10 | Wet | where, number-average molecular weight Mn of PLA-co-CA is 177,000, and in formula (I), m is 504 and n is 1429;

number-average molecular weight Mn of PEG-co-CA is 173,000, and in formula (II), m is 522 and n is 1501; and particle sizes (D50) of inorganic fillers $Al_2O_3$, $SiO_2$, and $TiO_2$ are 200 nm to 300 nm.

Figure 2:
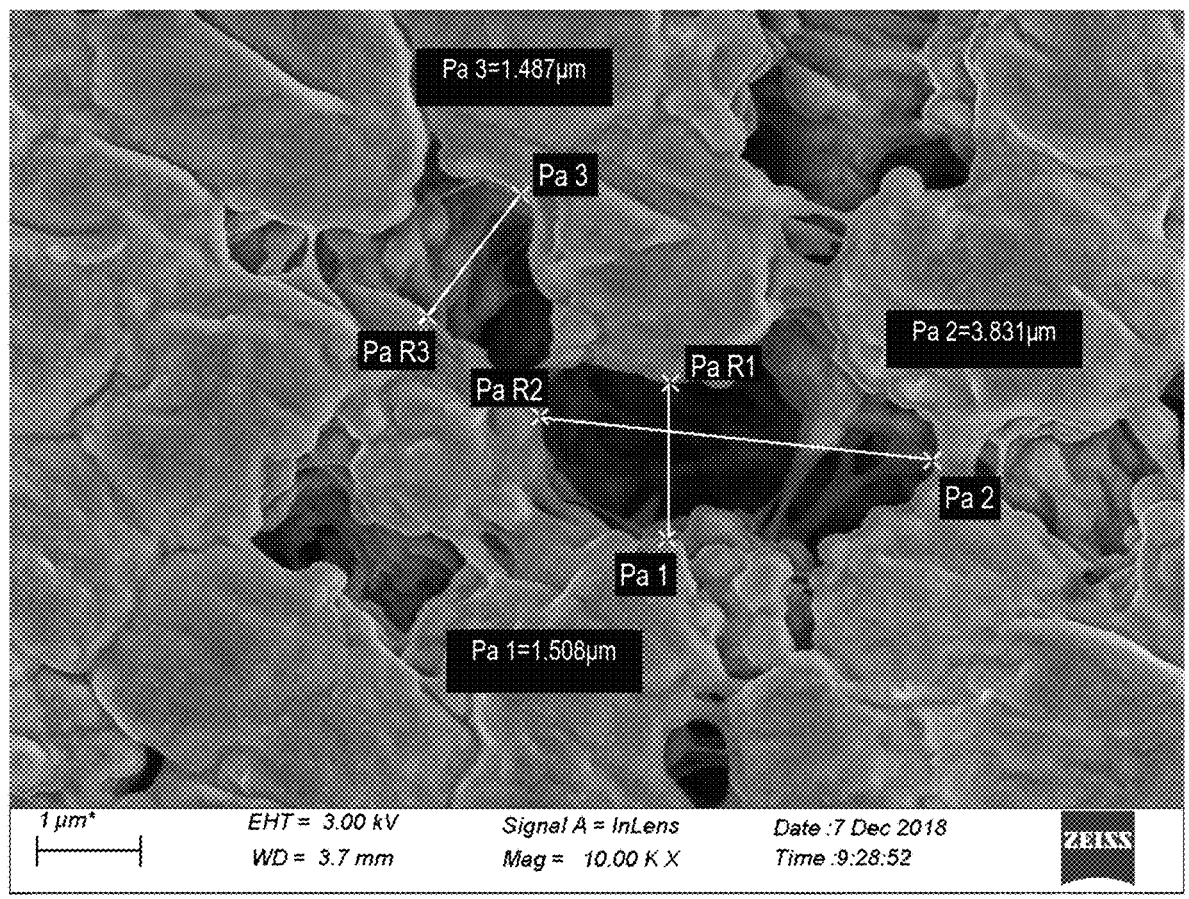
FIG. 2 is a scanning electron microscopy image of a polymer film in Comparative Example 2 at 10,000 times magnification.
Figure 3:
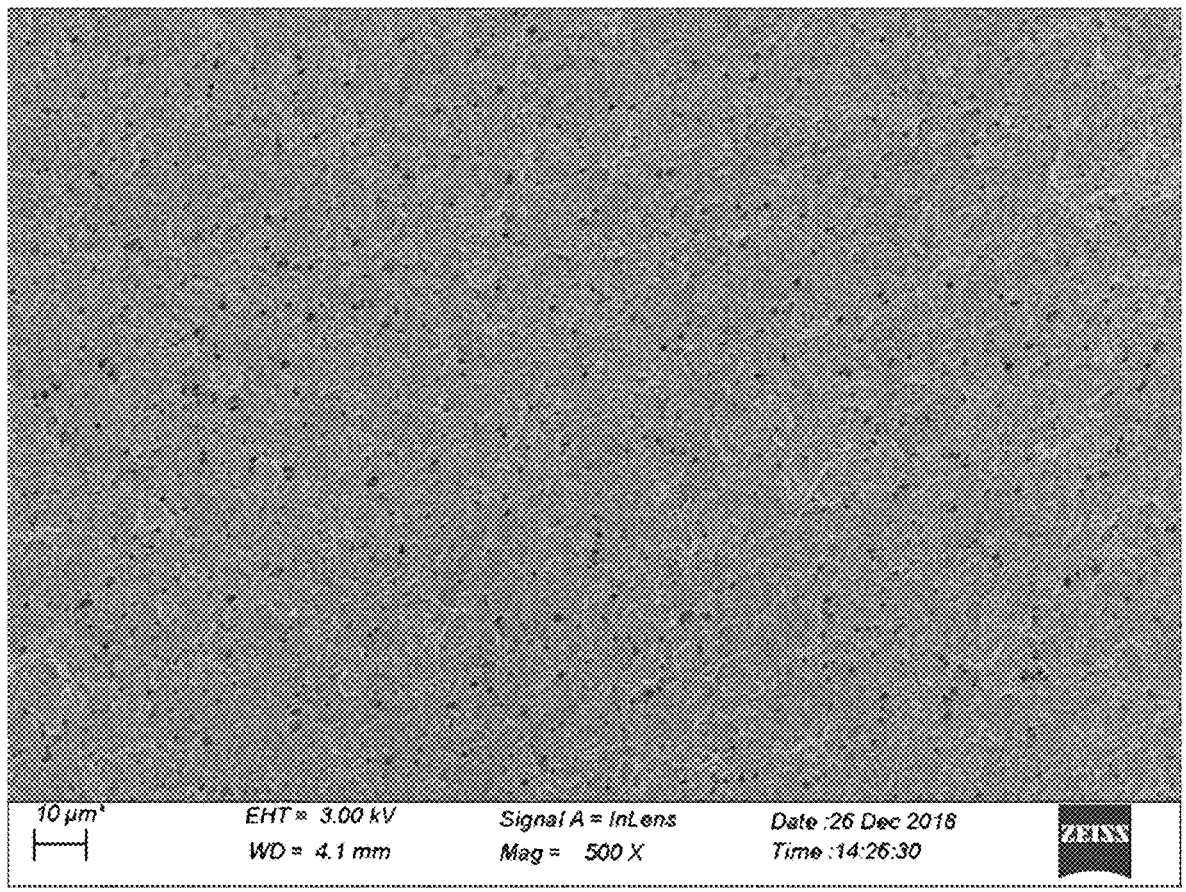
FIG. 3 is a scanning electron microscopy image of a polymer film in Example 2 at 500 times magnification.
Figure 4:
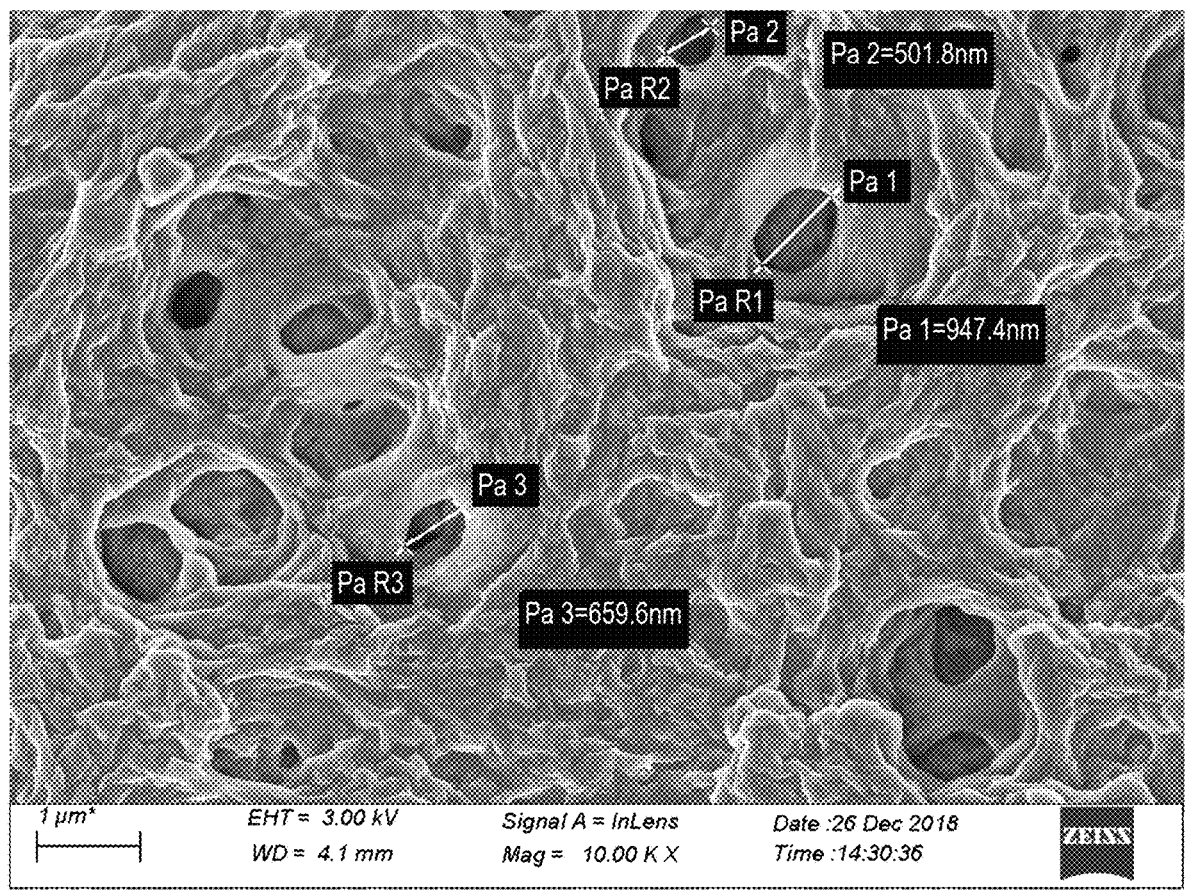
FIG. 4 is a scanning electron microscopy image of a polymer film in Example 2 at 10,000 times magnification.

The polymer protective films in Examples 1 to 8 and Comparative Example 2 were characterized and tested as follows:

The microscopic morphology of the polymer protective films in Examples 1 to 8 and Comparative Example 2 were characterized by scanning electron microscopy (SEM, SU8010, Hitachi, Japan). FIG. 1 and FIG. 2 are scanning electron microscopy images (SEM images) of the polymer protective film in Comparative Example 2 at 1,000 times and 10,000 times magnification. FIG. 3 and FIG. 4 are scanning electron microscope images (SEM images) of the polymer protective film in Example 2 at 500 times and 10,000 times magnification.

The ionic conductivity of the polymer films in Examples 1 to 8 and Comparative Example 2 was measured by electrochemical impedance spectroscopy (EIS, Solartron 1470e) under test conditions of 10 mV bias voltage and 106 to 0.01 Hz sweep frequency, with fitting calculation performed to obtain the ions conductivity.

The electrolyte holding coefficient (Electrolyte Holding coefficient, EH) and the traditional electrolyte intake coefficient (electrolyte intake coefficient) were measured by the foregoing test method.

The mechanical film properties of the polymer protective films in Examples 1 to 8 and Comparative Example 2 were tested by the following instruments and methods. Thickness of the protective film was tested by a Mitutoyo VL-50-B desktop force and thickness gauge. Acupuncture strength, tensile strength and elongation of the protective film were tested by a SUNS UTM6104 series electronic universal testing machine. According to China's national standard GB/T 1040.1-2018, the acupuncture strength test parameters include speed (50 mm/min) and sample thickness (0.015 mm), and tensile strength and elongation test parameters include spacing (50 mm), speed (500 mm/min), and sample thickness (0.015 mm).

The following tables 2 and 3 respectively show the mechanical film properties and morphology and electrical properties of the polymer protective films in Examples 1 to 8 and Comparative Example 2.

TABLE 2

Mechanical film properties of polymer protective films in Examples and Comparative Examples

| Number | Thickness of film | Puncture strength (Mpa) | Tensile strength (Mpa) | Elongation | Contact angle with electrolyte |
|---|---|---|---|---|---|
| Example 1 | 15 μm | 1.04 | 1.33 | 226% ± 2% | Approximately 0 |
| Example 2 | 15 μm | 1.58 | 1.63 | 220% ± 4% | Approximately 0 |
| Example 3 | 15 μm | 0.57 | 1.22 | 198% ± 2% | Approximately 0 |
| Example 4 | 15 μm | 0.55 | 1.15 | 205% ± 4% | Approximately 0 |
| Example 5 | 15 μm | 1.65 | 2.34 | 307% ± 3% | Approximately 0 |
| Example 6 | 15 μm | 1.64 | 2.88 | 479% ± 4% | Approximately 0 |
| Example 7 | 15 μm | 2.02 | 2.05 | 201% ± 2% | Approximately 0 |
| Example 8 | 15 μm | 1.52 | 1.99 | 207% ± 3% | Approximately 0 |
| Comparative Example 1 | / | / | / | / | / |
| Comparative Example 2 | 15 μm | 0.31 | 0.52 | 181% ± 2% | Approximately 0 |

TABLE 3

Morphology and electrical properties of polymer protective films in Examples and Comparative Examples

| Number | Average pore diameter | Ionic conductivity | Ionic conductivity after electrolyte intake | Electrolyte intake coefficient | Electrolyte holding coefficient |
|---|---|---|---|---|---|
| Example 1 | Approximately 800 nm | $1.0 \times 10^{-4}$ S/cm | $5.5 \times 10^{-3}$ S/cm | 229% ± 2% | 156% ± 2% |
| Example 2 | Approximately 800 nm | $0.8 \times 10^{-4}$ S/cm | $5.2 \times 10^{-3}$ S/cm | 201% ± 1% | 145% ± 2% |
| Example 3 | Approximately 400 nm | $0.5 \times 10^{-4}$ S/cm | $5.6 \times 10^{-3}$ S/cm | 165% ± 2% | 55% ± 1% |
| Example 4 | Approximately 400 nm | $1.2 \times 10^{-4}$ S/cm | $5.4 \times 10^{-3}$ S/cm | 151% ± 1% | 71% ± 1% |
| Example 5 | Approximately 200 nm | $0.9 \times 10^{-4}$ S/cm | $6.1 \times 10^{-3}$ S/cm | 157% ± 2% | 112% ± 2% |
| Example 6 | Approximately 400 nm | $1.0 \times 10^{-4}$ S/cm | $5.1 \times 10^{-3}$ S/cm | 166% ± 2% | 101% ± 2% |
| Example 7 | Approximately 400 nm | $0.5 \times 10^{-4}$ S/cm | $5.7 \times 10^{-3}$ S/cm | 182% ± 2% | 127% ± 2% |
| Example 8 | Approximately 600 nm | $0.8 \times 10^{-4}$ S/cm | $5.6 \times 10^{-3}$ S/cm | 199% ± 2% | 130% ± 2% |
| Comparative Example 1 | / | / | / | / | / |
| Comparative Example 2 | Approximately 1500 nm | $1.1 \times 10^{-4}$ S/cm | $5.1 \times 10^{-3}$ S/cm | 227% ± 2% | 37% ± 3% |

Cycle performance of the lithium metal batteries in Examples 1 to 8 and Comparative Examples 1 and 2 was tested by the following method: the lithium metal battery was charged to 4.3 V at a constant current of 0.5 C (60 mA), then charged at a constant voltage of 4.3 V until the current dropped to 0.05 C (6 mA), and then discharged to 3.0 V with a constant current of 0.5 C (60 mA) to obtain the first cycle specific discharge capacity ($C_{d1}$); and charging and discharging was repeated to the $n^{th}$ cycle and specific discharge capacity ($C_{dn}$) of the lithium secondary battery after n cycles was obtained. Capacity retention rate=specific discharge capacity ($C_{dn}$) after n cycles/specific discharge capacity ($C_{d1}$) in the first cycle. When the capacity retention rate dropped to 80%, cyclic life of the battery was considered to be terminated.

Figure 5:
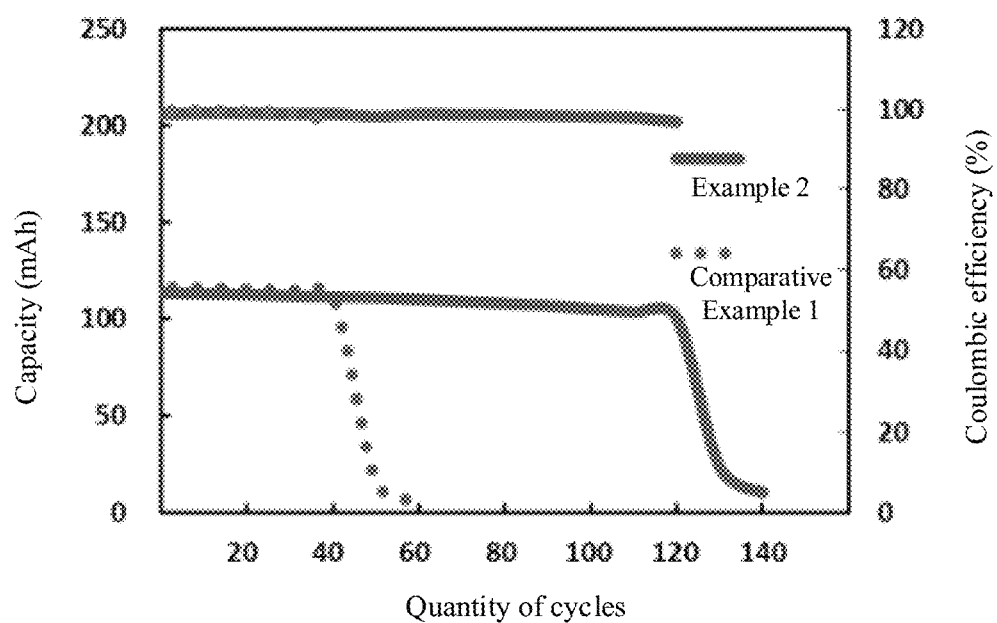
FIG. 5 is a comparison diagram of cycle performance of lithium metal batteries in Comparative Example 1 and Example 2.

FIG. 5 is a comparison diagram of cycle performance of lithium metal batteries in Comparative Example 1 and Example 2.

Table 4 below shows cycle performance of lithium metal batteries in Examples 1 to 8 and Comparative Examples 1 to 2.

TABLE 4

Cycle performance of lithium metal batteries
in Examples and Comparative Examples

| Number | Design capacity (mAh) | Charge efficiency/discharge efficiency | Quantity of cycles (when capacity fades to 80%) | Increase rate |
|---|---|---|---|---|
| Example 1 | 120 | 0.5 C/0.5 C | 80 | 0.905 |
| Example 2 | 120 | 0.5 C/0.5 C | 77 | 0.833 |
| Example 3 | 120 | 0.5 C/0.5 C | 57 | 0.357 |
| Example 4 | 120 | 0.5 C/0.5 C | 58 | 0.381 |
| Example 5 | 120 | 0.5 C/0.5 C | 104 | 1.486 |
| Example 6 | 120 | 0.5 C/0.5 C | 109 | 1.595 |
| Example 7 | 120 | 0.5 C/0.5 C | 114 | 1.714 |
| Example 8 | 120 | 0.5 C/0.5 C | 122 | 1.905 |
| Comparative Example 1 | 120 | 0.5 C/0.5 C | 42 | \ |
| Comparative Example 2 | 120 | 0.5 C/0.5 C | 52 | 0.238 |

It can be seen from Table 4 that the cyclic life of the lithium metal batteries in Examples 1 to 8 is significantly longer than that of the lithium metal batteries in Comparative Examples due to the polymer protective film.

In addition, the lithium-metal secondary batteries in Examples 1 to 8 and Comparative Examples 1 and 2 were disassembled, and the surfaces of their lithium metal negative electrode plates were observed by using an optical microscope. The interface films formed on the surfaces of the lithium metal negative electrode plates of the lithium metal batteries in Examples 1 to 8 were thin and dense, while the surfaces of the lithium metal negative electrode plates of the lithium metal batteries in Comparative Examples 1 and 2 were covered with thick and fluffy dark brown deposits which contained a large amount of lithium dendrites. As the lithium-metal negative electrode plates in Examples were disposed on their surfaces with polymer protective films which had high mechanical strength, the polymer protective films inhibited the growth of lithium dendrites; in addition, the polymer protective film also had good electrolyte holding capacity, thereby reducing excessive consumption of the electrolyte and improving cycle life of the batteries; carboxyl and hydroxyl groups contained in the polymer protective film structure could slowly react with lithium metal to generate —COOLi and —OLi, thereby inhibiting side reactions of the lithium metal and the electrolyte, and further reducing consumption of the electrolyte; and this gentle and slow reaction helps to form a SEI film with good performance on the surface of the lithium-metal negative electrode plate, further inhibiting excessive reaction between the lithium-metal negative electrode plate and the electrolyte, and improving safety performance and cycle performance of the lithium secondary battery.

According to the disclosure and teaching of this specification, a person skilled in the art may make further changes or modifications to the foregoing embodiments. Therefore, this application is not limited to the foregoing disclosure and the described specific embodiments, and some changes or modifications to this application shall also fall within the protection scope of the claims of this application. In addition, although some specific terms are used in this application, these terms are used only for ease of description, and do not constitute any limitation on this application.

What is claimed is:

1. A negative electrode plate, comprising a negative electrode current collector and a lithium-metal negative electrode disposed on at least one surface of the negative electrode current collector, wherein
a polymer protective film is disposed on a surface of the lithium-metal negative electrode away from the negative electrode current collector, the polymer protective film comprises a citric acid copolymer, and a number-average molecular weight Mn of the citric acid copolymer is 10,000 to 1,000,000.

2. The negative electrode plate according to claim 1, wherein the citric acid copolymer comprises a reactive block polymer represented by formula (I) and/or formula (II):

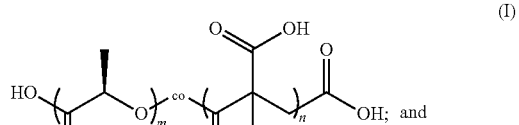

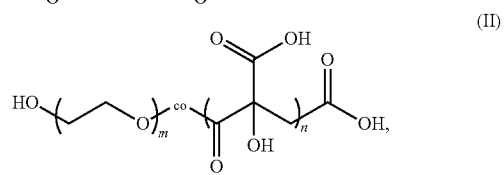

wherein m is an integer selected from 10 to 5000, and n is an integer selected from 10 to 5000.

3. The negative electrode plate according to claim 2, wherein the reactive block polymer meets the following conditions: m is an integer selected from 400 to 600, n is an integer selected from 1000 to 2000, and the number-average molecular weight Mn is 80,000 to 350,000.

4. The negative electrode plate according to claim 2, wherein the citric acid copolymer comprises a mixture of reactive block polymers represented by formula (I) and formula (II), wherein a mass ratio of the reactive block polymers represented by formula (I) and formula (II) is 1:1 to 1:2, and n/m is 2.5 to 3.5.

5. The negative electrode plate according to claim 1, wherein the polymer protective film further comprises a fluorine-containing lithium salt, a fluorine-containing film former, and an inorganic filler, wherein the fluorine-containing lithium salt is selected from one or more of lithium bistrifluoromethanesulfonimide, lithium bisfluoromethanesulfonimide, and lithium difluoro (oxalate) borate;

the fluorine-containing film former is selected from one or more of polyvinylidene fluoride, polyvinylidene fluoride-hexafluoropropene, and polytetrafluoroethylene; and the inorganic filler is selected from one or more of $Al_2O_3$, $TiO_2$, and $SiO_2$.

6. The negative electrode plate according to claim 5, wherein a particle size of the inorganic filler is 10 nm to 1000 nm.

7. The negative electrode plate according to claim 1, wherein the polymer protective film further comprises lithium bis(oxalate)borate, a fluorine-containing film former, and an inorganic filler;

the fluorine-containing film former is selected from one or more of polyvinylidene fluoride, polyvinylidene fluoride-hexafluoropropene, and polytetrafluoroethylene; and the inorganic filler is selected from one or more of $Al_2O_3$, $TiO_2$, and $SiO_2$.

8. The negative electrode plate according to claim 1, wherein the citric acid copolymer comprises a reactive block polymer;

the polymer protective film further comprises a fluorine-containing lithium salt, a fluorine-containing film former, and an inorganic filler; and parts by mass of the reactive block polymer, the fluorine-containing film former, the inorganic filler, and the fluorine-containing lithium salt in the polymer protective film are respectively 25 parts to 60 parts, 30 parts to 80 parts, 1 part to 10 parts, and 1 part to 10 parts.

9. The negative electrode plate according to claim 1, wherein thickness of the polymer protective film is 5 μm to 30 μm.

10. The negative electrode plate according to claim 1, wherein tensile strength of the polymer protective film is 0.5 MPa to 3.0 MPa;

puncture strength of the polymer protective film is 0.5 MPa to 2.0 MPa; and elongation of the polymer protective film is 100% to 500%.

11. The negative electrode plate according to claim 1, wherein electrolyte holding capacity of the polymer protective film is 50% to 200%.

12. A lithium metal battery, comprising a positive electrode plate, a negative electrode plate, a separator sandwiched between the positive electrode plate and the negative electrode plate, and an electrolyte, wherein the negative electrode plate is the negative electrode plate according to claim 1.

13. The lithium metal battery according to claim 12, wherein the electrolyte comprises fluoroethylene carbonate, linear carbonate, and fluorine-containing lithium salt, a mass percentage of the fluoroethylene carbonate is 20% to 50%; and the fluorine-containing lithium salt is selected from one or more of lithium bistrifluoromethanesulfonimide, lithium bisfluoromethanesulfonimide, and lithium difluoro (oxalate) borate.

14. An apparatus, comprising the lithium metal battery according to claim 12.

* * * * *